United States Patent [19]

Lynch

[11] Patent Number: 5,346,439
[45] Date of Patent: Sep. 13, 1994

[54] TOOTHED TRANSMISSION BELT
[75] Inventor: William R. Lynch, Copiague, N.Y.
[73] Assignee: Winfred M. Berg, Inc., East Rockaway, N.Y.
[21] Appl. No.: 277
[22] Filed: Jan. 4, 1993
[51] Int. Cl.$^5$ ............................................. F16D 1/00
[52] U.S. Cl. .................................................. 474/205
[58] Field of Search ............... 474/205, 153, 242, 268, 474/265

[56] References Cited

U.S. PATENT DOCUMENTS

| | | |
|---|---|---|
| 2,566,262 | 8/1951 | Traxler . |
| 2,770,977 | 11/1956 | Beckadolph et al. . |
| 4,026,162 | 5/1977 | Berg . |
| 4,586,915 | 5/1986 | Cathey et al. ......................... 474/205 |
| 4,604,080 | 8/1986 | Mizuno ................................. 474/153 |
| 4,605,389 | 8/1986 | Westhoff .............................. 474/153 |
| 4,650,443 | 3/1987 | Wetzel ............................ 474/205 X |
| 4,775,357 | 10/1988 | Wolfe .................................. 474/205 |
| 4,840,606 | 6/1989 | Wetzel ................................. 474/153 |
| 4,915,674 | 4/1990 | Tanaka et al. ................. 474/205 X |
| 5,209,705 | 5/1993 | Gregg ............................ 474/205 X |

Primary Examiner—Thuy M. Bui
Attorney, Agent, or Firm—Lorusso & Loud

[57] ABSTRACT

A toothed transmission belt adaptable for use with drive transmission having a series of teeth, where the curve of each tooth is based on Schiele's Anti-Friction Formula which describes a tractrix curve.

3 Claims, 3 Drawing Sheets

TOOTHED TRANSMISSION BELT

BACKGROUND OF THE INVENTION

The invention relates to toothed transmission drive belts such as timing gear belts, or the like which provide for positive, non-slip drive. Belts having teeth are known in the art.

For example, U.S. Pat. No. 2,181,001 to Smith discloses belts supplied with vacuum cavities that have a shape between that of a hemisphere and a parabola. U.S. Pat. No. 4,026,162 to Berg shows a toothed transmission belt adaptable for use with gears and sprockets having an elongated body portion having at least one elongated flexible body element cable with a flexible belt-like covering and a series of teeth indented into the belt-like covering.

A problem with the existing belts is that they do not always provide smooth and precise movement. Problems have arisen with respect to belt cogging or jumping, and with rotational fluctuations that interfere with the movement of the belt. As a result, the belts do not always provide ideal wear characteristics.

Thus, it is an object of the present invention to provide a timing belt having improved wear characteristics.

It is another object of the present invention to provide a timing belt that eliminates belt cogging and jumping and provides a smoother and more precise movement.

It still another object of the present invention to reduce rotational velocity fluctuations to provide a smoother and more precise movement.

SUMMARY OF THE INVENTION

These and other objectives of the present invention are achieved by providing a toothed transmission belt in which the shape of each tooth conforms to Schiele's Anti-Friction Formula which describes a tractix curve. When teeth of the belt are formed according to that formula, the belt sides move tangentially to the pulley teeth during engagement and disengagement, resulting in a smoother and more precise movement.

DETAILED DESCRIPTION OF THE DRAWING

An understanding of this invention may be had from the detailed discussion which follows and from an examination of the drawing in which.

DETAILED DESCRIPTION OF THE PREFERRED EMBODIMENT

Figure 1:
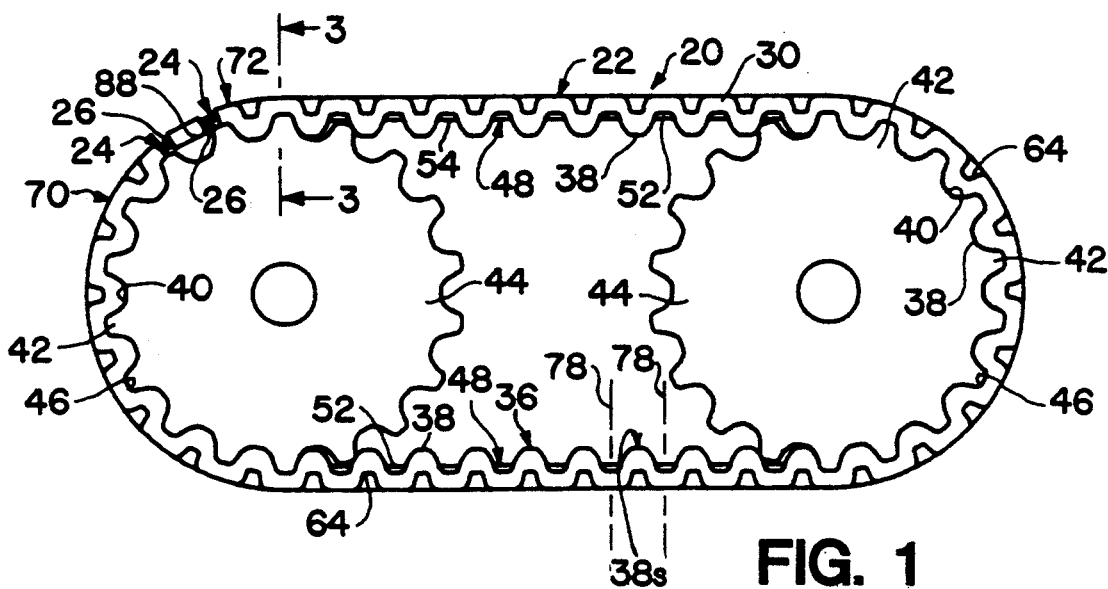
FIG. 1 is an elevational view of the drive transmission means of the claimed invention.

FIG. 1 shows the drive transmission means 20 of the claimed invention. It comprises a main body portion formed by at least one elongated flexible body element 22 which in turn comprises a central cable 24 made up of multiple strands 26 of twisted steel, wire or other suitable material.

Figure 4:
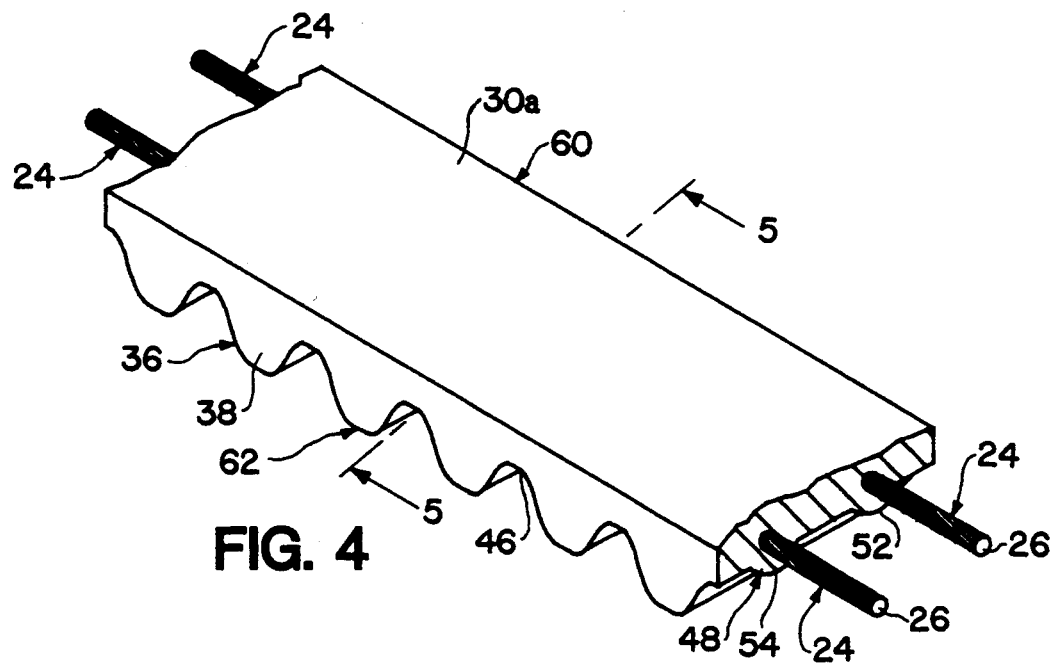
FIG. 4 is a view similar to FIG. 2 illustrating a second form of transmission belt of the invention.
Figure 5:
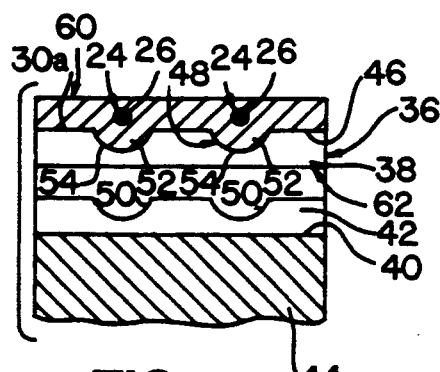
FIG. 5 is a sectional view along the lines 5—5 in FIG. 4.

Belt means 30 may be extruded or molded over the cable 24 by any means known to the art, or the cable 24 and the belt may be fashioned integrally as a combination cable cover and belt 30a, as shown in FIGS. 4 and 5.

Belt covering means 30 and 30a are provided with indented portions 36 which form teeth 38. This provides for a firm yet flexible construction. The teeth 38 are adapted to mesh within the cavity 40 of the teeth 42 of the toothed transmission wheel means such as pulleys 44 to drive the pulleys 44 whose teeth 42 also fit within the cavities 46 formed between the teeth 38 of the belt means 30 or 30a.

Figure 10:
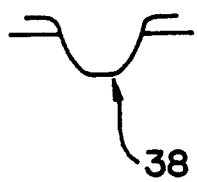
FIG. 10 is a sectional view showing the curve of a tooth.

A belt tooth section 38S is defined as that section or unit of belt 20 starting at the center line 78 of a cavity 46 and ending at the center line 78 of the next cavity 46 and including the tooth 38 positioned between said cavity 46 and center 78. The shape of the tooth is based upon Schiele's Anti-Friction Tractrix as shown in FIG. 10 and is governed by the equation:

$$x = +/-a \, [\cosh^{-1} a/y - \sqrt{1 - (y/a)^2}\,]$$

where a is a constant, x represents a value along a y-axis, and cosh represents an inverse hyperbolic cosine function.

This shape provides a very strong tooth and minimizes the friction between the tooth sides on the belt and the teeth of the transmission wheel means (i.e., the pulley teeth). When the teeth of the belt are formed according to that formula, the belt sides move tangentially to the pulley teeth during engagement and disengagement, resulting in smooth and precise movement.

The construction of the belt means 30 or 30a also provides for belt guide means 48 adapted to fit groove means 50 in the pulley teeth 42. Guide means 48 are made up of a series of arc-like belt guide portions 52 positioned in the cavities 46 between the belt teeth 38. Portions 52 have an arc-like configuration having a curved surface portion 54 concentric to the portion of cable 24 which it covers. Thus, the construction comprising the integral belt and cover 30a or the belt 30 over the cable 24 with the teeth 38 and the belt guide portions 52 provide a transmission belt means 20 having a positive drive for a toothed pulley 44 and also having belt guide means 48 to prevent the belt from "walking off" the pulley 44.

This construction eliminates the necessity of expensive side flanges for the pulley 44 to hold the belt 20 in place, which also would require maintenance, and provides a strong, lightweight, and extremely flexible belt 20 which nevertheless has positive drive.

Figure 2:
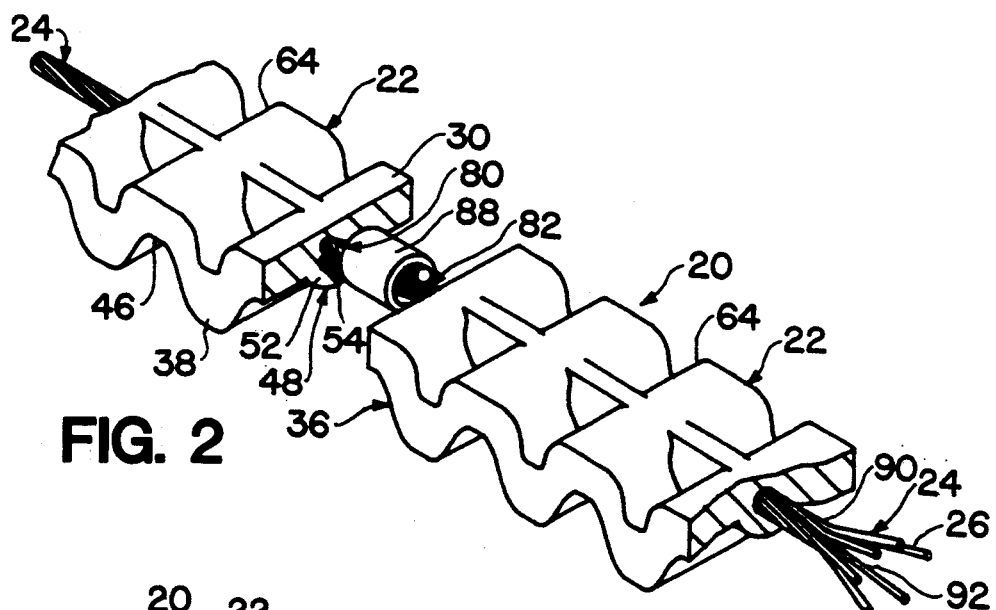
FIG. 2 is an enlarged perspective view of the transmission belt of FIG. 1 with parts cut away.
Figure 3:
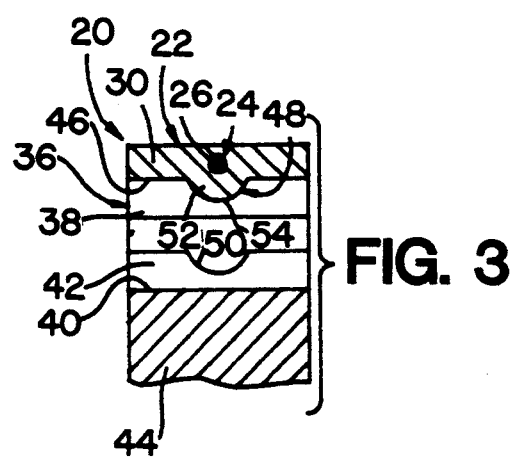
FIG. 3 is an enlarged sectional detail along the lines 3—3 in FIG. 1.

The belt may have a smooth side 60 opposite the toothed side 62 of belt means 30a, as shown in FIG. 4, or, if desired, recessed portions 64, opposite the indented teeth 38, may be provided as in belt means 30 as shown in FIG. 2. The recessed portion provides improved flexibility.

Where there is a belt having two or more cables 24, belt guide means 48 and grooves 50 may be provided with relation to each cable 24 (see FIG. 5).

Figure 6:
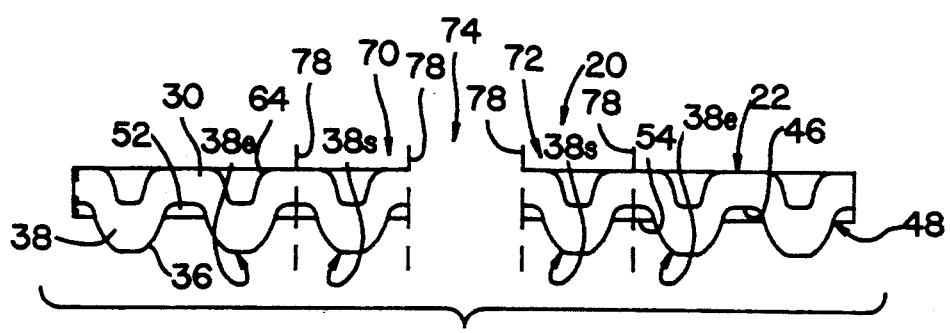
FIG. 6 is an elevational view in loop end facing relationship prior to being spliced into an endless loop with parts cut away.
Figure 7:
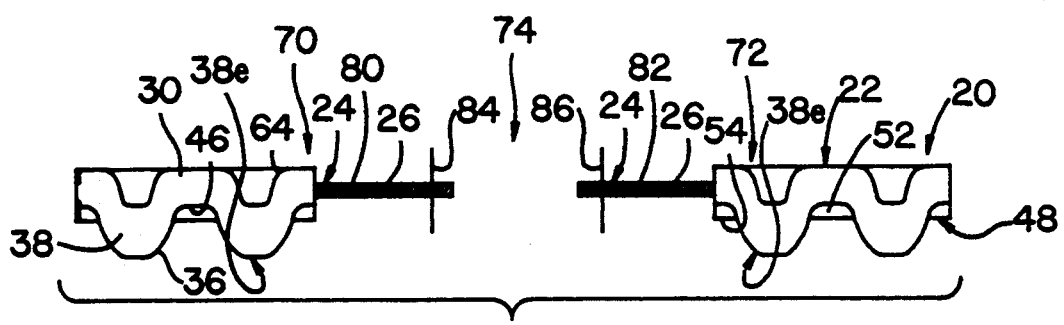
FIG. 7 is an elevational view similar to FIG. 6 showing a step in the splicing of the belt.

The transmission belt 20 is made in selected lengths as desired for splicing into endless belts 20 of desired sizes. The splice is made as illustrated in FIGS. 6 through 9 of the drawings. In FIG. 6 a single length of a transmission belt 20 is shown which has been coiled around to form an endless loop with its ends 70 and 72 in end facing relationship. In FIGS. 6 through 9 only the ends 70 and 72 of belts 20 are shown since the balance of the belt 20 has been cut away in these figures.

In order to splice the belt 20 so that the teeth 38 will fit within the cavities 40 of the pulleys 44, provision must be made to space the two teeth 38E adjoining the splice area 74 to be positioned properly with the splice 76 taking up the space required by one toothed belt section 38S. This is accomplished by providing a length of belt 20 having end portions 70 and 72 which include belt tooth sections 38S which are overlapped to form the splice 76 of the same length as a single belt tooth section 38S.

Let it be assumed that belt 20 would require twenty-eight belt tooth sections 38S to drive between two pulleys 44 as in FIG. 1. Since the splice 76 must take the place of one belt tooth section 38S and since it is necessary for ends 70 and 72 to overlap in making the splice 76, the length of belt 20 necessarily would contain the splice 76 plus twenty-seven belt tooth sections 38S. The splice space 76 is equal to two belt tooth sections 38S which are overlapped into the splice 76. Thus, a length of belt for a system requiring twenty-eight tooth sections 38A would actually need twenty-nine tooth sections 38A, or one extra to make the splice 76.

The first step in splicing is to provide a proper size belt length, as described. The second step in splicing is to cut all of the cover material 30, or the belt material 30a, from the cable 24 to lay bare cable ends at 80 and 82 for the length of the end of tooth sections 38S, as in FIG. 7. The next step is to trim ends 80 and 82 a small amount (between approximately 5 to 15 percent of the end 80 and 82 lengths) as shown by the dotted lines at 84 and 86 in FIG. 7.

Figure 8:
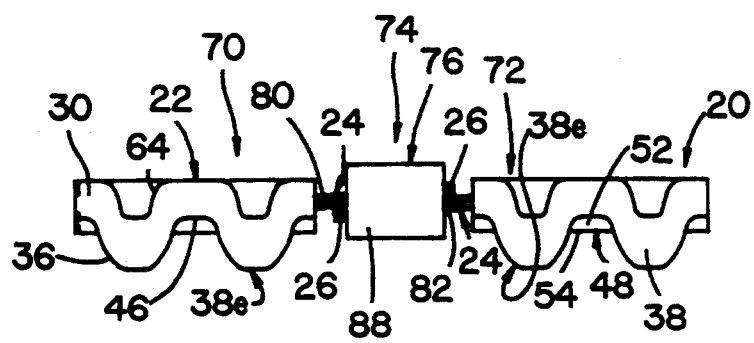
FIG. 8 is an elevational view showing a further step in the splicing which includes the positioning of a bushing.
Figure 9:
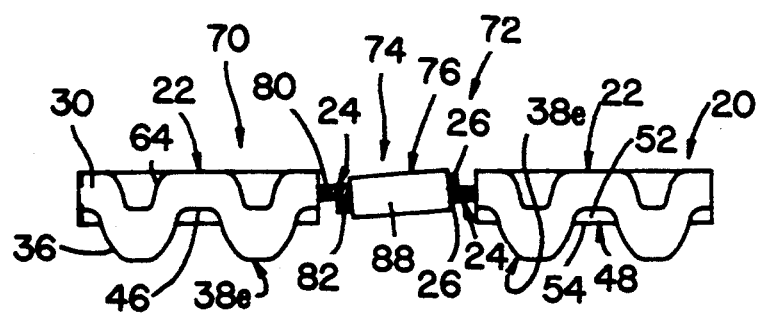
FIG. 9 is an elevational view showing the splice completed with the bushing installed.

The next step is to overlap the cut cable ends 80 and 82 between end tooth units 38E to make a splice space 74 of the length of a single belt tooth section 38S, and then a step of placing an open slice bushing 88 over the overlapped cable ends 80 and 82, as shown in FIG. 8. The final step of the splice is to crimp the open bushing 88 with a crimping tool or by other means to force bind the cable ends 80 and 72 together in positive arrangement by closing the bushing 88.

The splice 76 will ride along over the pulleys 44 with the belt 20 and, if properly made with the splice 76 of the same length as a single belt tooth section, will ride over a pulley cavity 40. Thus the completed belt loop will present teeth 38 to the pulley cavities 40 with the exception of the one belt length comprising the splice. Since there will be a plurality of teeth engaging each pulley, skipping one space for the splice will not affect the efficiency or usability of the belts of the invention.

In addition to the advantages already mentioned, there is a further advantage in the strengthening of the cable of the invention in that the material of the jacket 28, which is extruded or molded around the cable 24, will be filled into the spaces 90 around the outer strands 26 of the cable 24 and may also be filled into all of the spaces such as 92 within the cable 24 between the strands 26 of the cable 24 which communicate with the outer surface of the cable.

The invention may be used with a cable reinforcement in endless configuration or with sliceable strands. The belts may have any pitch, such as 0.080", 0.0816", 0.200", 0.375", 0.500", 3mm, 5mm, 8mm, 14mm or others.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are intended to be embraced therein.

What is claimed is:

1. A belt for use in drive transmission means comprising a top portion and a bottom portion, said bottom portion having a plurality of indented portions forming teeth adapted to mesh within cavities of toothed transmission wheel means wherein each tooth has a shape corresponding to the following equation:

$$x = +/- a[\cosh^{-1} a/y - \sqrt{1-(y/a)^2}]$$

where a is a constant, x is a value along an x-axis, y is a value along a y-axis, and cosh represents an inverse hyperbolic cosine function.

2. An improved drive transmission means of the type having an elongated body portion comprising at least one cable and belt means surrounding said cable, said belt means including a plurality of teeth; wherein the improvement comprises teeth in the belt having a shape corresponding to the following equation:

$$x = +/- a[\cosh^{-1} a/y - \sqrt{1-(y/a)^2}]$$

where a is a constant, x is a value along an x-axis, y is a value along a y-axis, and cosh represents an inverse hyperbolic cosine function.

3. A belt for use in a drive transmission means comprising an elongated body portion comprising at least one cable comprising a plurality of flexible twisted strands of metal, a covering means comprising a flexible plastic cable jacket which surrounds the cable, and belt means comprising a plurality of teeth; said plurality of teeth each having a shape defined by the equation;

$$x = +/- a[\cosh^{-1} a/y - \sqrt{1-(y/a)^2}]$$

where a is a constant, x is a value along an x-axis, y is a value along a y-axis, and cosh represents an inverse hyperbolic cosine function, said belt means further including belt guide means comprising at least one arc-like portion formed around at least one portion of the cable, in which there are a plurality of arc-like portions in the belt guide means with at least one such portion positioned in a cavity between at least one pair of adjoining teeth of said plurality of teeth, to form an intermittent longitudinal belt guide means, wherein the at least one portion forming the intermittent longitudinal belt guide means has surface configurations which are insubstantial concentric relation to at least one portion of the surface of the cable, and in which the plurality of teeth are formed along one side of the belt means and the other side of the belt means is provided with at least one recessed portion positioned opposite a toothed portion of said belt, wherein the belt forms an endless loop comprising at least one splice which comprises at least one cable end and a crimped bushing, said splice being the same relative length as a single belt tooth.

* * * * *

UNITED STATES PATENT AND TRADEMARK OFFICE
CERTIFICATE OF CORRECTION

PATENT NO. : 5,346,439
DATED : September 13, 1994
INVENTOR(S) : William Lynch

It is certified that error appears in the above-indentified patent and that said Letters Patent is hereby corrected as shown below:

Column 3; Line 30: "388" should read "38S"
Column 3; Line 33: "388" should read "38S"
Column 3; Line 43: "388" should read "38S"

Signed and Sealed this

Twenty-fifth Day of April, 1995

Attest:

BRUCE LEHMAN

Attesting Officer    Commissioner of Patents and Trademarks